United States Patent
Woodard

(10) Patent No.: US 7,366,736 B1
(45) Date of Patent: Apr. 29, 2008

(54) METHOD AND SYSTEM FOR GENERATING REAL-TIME SIMULATOR DATABASE

(75) Inventor: Timothy A. Woodard, Binghamton, NY (US)

(73) Assignee: Diamond Visionics L.L.C., Vestal, NY (US)

( * ) Notice: Subject to any disclaimer, the term of this patent is extended or adjusted under 35 U.S.C. 154(b) by 230 days.

(21) Appl. No.: 11/381,774

(22) Filed: May 5, 2006

Related U.S. Application Data

(63) Continuation-in-part of application No. 10/249,918, filed on May 19, 2003, now abandoned.

(51) Int. Cl.
*G06F 17/00* (2006.01)

(52) U.S. Cl. .......... 707/104.1; 345/428; 345/440; 707/101

(58) Field of Classification Search ............ None
See application file for complete search history.

(56) References Cited

U.S. PATENT DOCUMENTS

| | | | |
|---|---|---|---|
| 4,807,158 A * | 2/1989 | Blanton et al. | 345/581 |
| 5,978,804 A * | 11/1999 | Dietzman | 707/10 |
| 6,208,997 B1 * | 3/2001 | Sigeti et al. | 707/104.1 |
| 6,272,501 B1 * | 8/2001 | Baumann | 707/104.1 |
| 6,373,489 B1 * | 4/2002 | Lu et al. | 345/428 |
| 6,724,931 B1 * | 4/2004 | Hsu | 382/155 |
| 6,954,764 B2 * | 10/2005 | Biswas et al. | 707/104.1 |
| 2002/0060685 A1 * | 5/2002 | Handley et al. | 345/582 |
| 2005/0253843 A1 * | 11/2005 | Losasso Petterson et al. | 345/428 |
| 2006/0146053 A1 * | 7/2006 | Gatewood et al. | 345/440 |

* cited by examiner

*Primary Examiner*—Don Wong
*Assistant Examiner*—Andalib F Lodhi
(74) *Attorney, Agent, or Firm*—Malin Haley DiMaggio Bowen & Lhota, P.A.

(57) ABSTRACT

A method and system to provide visualization of high resolution terrain for use in real-time simulation for digital image displays that is derived directly from source data including imagery, classification, elevation and vector data at run-time with little or no off-line manipulation of the source data. The fidelity of the visualization is scalable based on the graphic system's capability. Readily available worldwide data exists for imagery, classification, elevation, vector and airport runway data.

4 Claims, 5 Drawing Sheets

METHOD AND SYSTEM FOR GENERATING REAL-TIME SIMULATOR DATABASE

BACKGROUND OF THE INVENTION

1. Field of the Invention

This invention relates generally to real-time simulator image display including earth terrain simulation and, more specifically, to a method and system for generating databases used in real-time image displays including real-time simulators.

2. Description of Related Art

Real-time geo-specific terrain visualization has become an increasingly important requirement for military as well as commercial simulation endeavors. It is critical to be able to quickly generate accurate, realistic terrain databases for battlefield and flight simulators. During offensive operations, the military may use these simulators to plan and create the sequences of events that occur during a mission before an actual battle. Also, flight training for commercial and military pilots is significantly improved when simulators have updated information concerning the area where the pilots actually fly and the airfields where they take off and land.

Traditionally, these terrain databases are generated manually using a visual database design system (VDBDS). The person utilizing the VDBDS must specify the input data sources including satellite and aerial imagery, digital elevation data, vector shapes used to define roads, rivers and other boundaries, and 3-D models of buildings and other ground features. This process is quite costly and time consuming. Once the input sources have been identified, the database modeler must then configure numerous VDBDS options that control how the input data will be processed and ultimately define the fidelity of the output database. The database modeler must ensure an appropriate balance between fidelity and performance such that the target simulation platform can process the database in real-time. Once the VDBDS has been configured, it must then process all of the input sources by combining them into merged database with the modeler-specified characteristics. The merged database contains polygons and texture in varying levels of detail (LODs). The visual simulation system loads and utilizes this merged database at run-time through a process generally known as "database paging". Patented examples of this approach include SmartMesh™ developed by Terrain Experts and ROAM (Real-time Optimally Adaptive Mesh) developed by The University of California.

There are numerous significant drawbacks with the above approach. The processing time required by a typical VDBDS to produce a large area database can be on the order of days or weeks, requiring dedicated CPU resources and resulting in databases that require far more disk space than the source data they are produced from. If new data becomes available (e.g. updated aerial imagery of a target area collected by a reconnaissance mission) then the database modeler must reconfigure the VDBDS to utilize the new data. Once reconfigured, the VDBDS must then reprocess the input data, requiring days or weeks before the results can be visualized.

Another significant disadvantage to the above approach is that the resulting databases do not automatically scale with hardware advancements. Modern graphics hardware performance doubles approximately every six months [ref]. In order to take advantage of the fidelity afforded by improved graphics capabilities, a database modeler must reconfigure the VDBDS to produce more detailed output. As the output detail increases, so does the time required by the VDBDS to process the source data, as well as the size of the resulting database.

Large databases tax system resources such as CPU time and disk access at run time. This limits the practical extent of databases produced using the approach described above. Furthermore, because all processing must be performed prior to run-time, the entire database must be produced offline. For large-area databases, many of the resulting database LODs may never actually be visualized and are therefore wasted. Finally, the quality of the database generated is entirely dependant upon the skill of the database modeler, making it necessary to have an expert on hand for updating the visual databases.

Because of these limitations, a need exists to overcome the problems with the prior art, and particularly for a system and method which combines proven tools and algorithms with freely available data to create a worldwide database generation system.

SUMMARY OF THE INVENTION

A method and system provides visualization of high-resolution terrain for use in real time simulation for digital image displays directly from source data (imagery, classification, elevation, and vector data) at run-time, with little or no off-line manipulation of the source data. This allows terrain visualization to begin very shortly after source data becomes available. The fidelity of the visualization is scalable based on the graphics system capabilities. Where imagery is not available, the system and method produces synthesized imagery from land classification data as well as other available worldwide data.

Readily available worldwide data exists for imagery, classification, elevation, vector, and airport runway data. Airport runway data is presently updated monthly and may contain information regarding the size, orientation, elevation, slope, markings, and lighting systems for each runway.

It is an object of this invention to provide a low cost database image generator for use in real-time simulation for visualization of high resolution terrain for digital image displays directly from source data.

It is another object of this invention to provide a method and system that can provide for real-time simulation image generator with little or no off-line manipulation of the source data including imagery, classification, elevation and vector data at run-time.

In accordance with these and other objects which will become apparent hereinafter, the instant invention will now be described with particular reference to the accompanying drawings.

DESCRIPTION OF THE PREFERRED EMBODIMENTS

Figure 1:
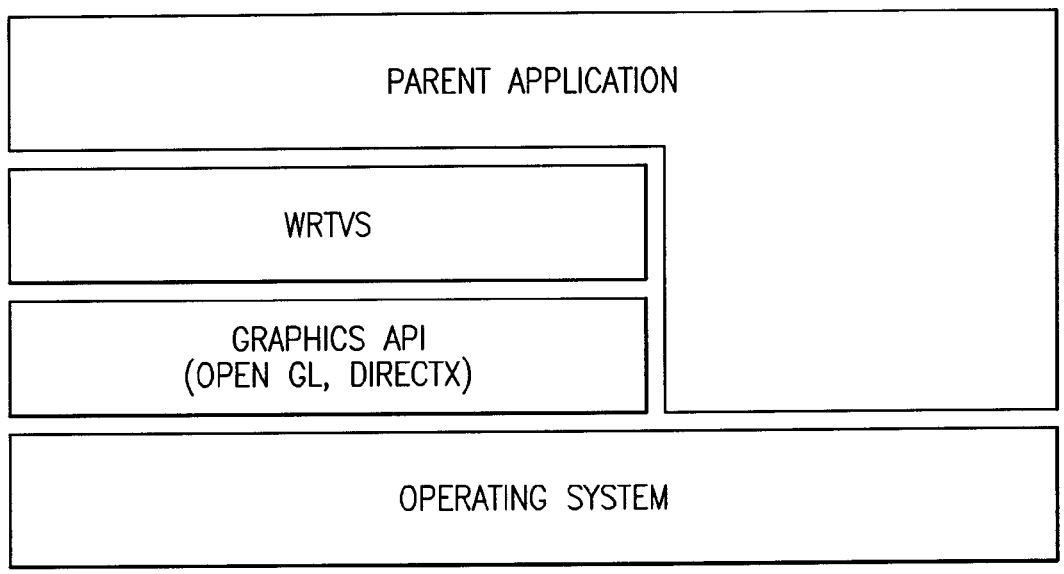
FIG. 1 shows a schematic diagram of the invention.

The present invention, according to a preferred embodiment, overcomes problems with the prior art by combining proven tools and algorithms into a software library here called the Worldwide Runtime Terrain Visualization System (WRTVS). Referring now to FIG. 1, as a software library, the WRTVS is utilized by a parent application which communicates to the WRTVS required information (such as the current latitude, longitude, and view orientation) via function calls. The WRTVS then utilizes a common graphics API (e.g., OpenGL or DirectX) to communicate with the graphics card in the operating system to display the terrain in the region of interest. By default, the WRTVS utilizes an included worldwide data set derived from freely available sources for terrain visualization. Furthermore, the WRTVS can utilize high resolution source data with minimal requirements for manual data preparation.

Today, there are numerous worldwide datasets that are freely available. This data includes imagery, classification, elevation, vector, airport runway information for every known runway, and many others. The WRTVS can readily incorporate much of this available information to quickly create an accurate worldwide terrain simulation. Because there is no need to store intermediate results to disk, storage requirements are greatly reduced. The WRTVS is designed to utilize commercial off-the-shelf graphics hardware, which greatly reduces costs. Because the capabilities of the graphics hardware increase rapidly, the WRTVS provides for scalable fidelity. Therefore, as hardware capabilities increase, the fidelity of the WRTVS increases as well.

Figure 2:
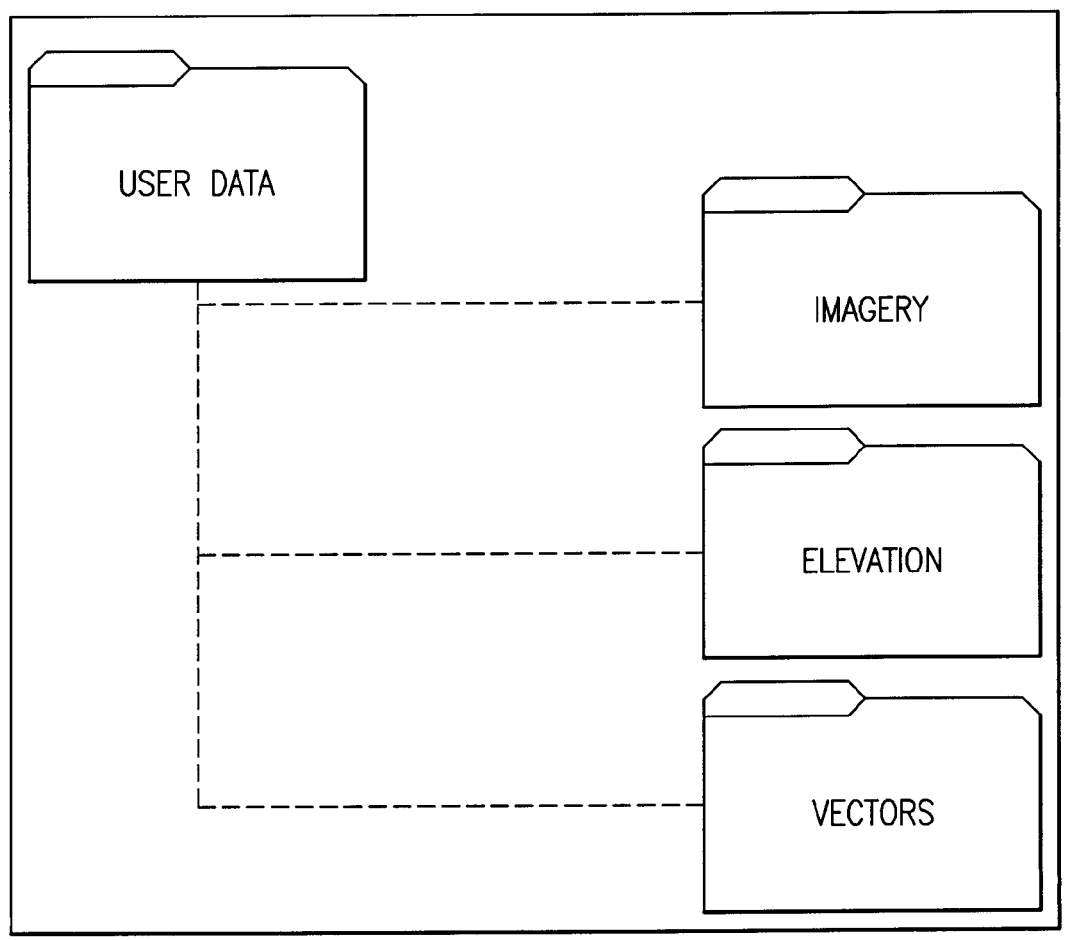
FIG. 2 shows a schematic diagram of a data directory hierarchy.

Referring now to FIG. 2, a data directing hierarchy is shown. In order to facilitate run-time processing of source data, a basic file system organization is imposed by the WRTVS. Each type of source data is assigned a directory on disk where the WRTVS searches for available data.

Data falls into two general categories: data which contains embedded geo-referencing information, and data which depends on the file hierarchy for geo-referencing. For data types that contain embedded geo-referencing information defining the extent and resolution of the data, there is no imposed hierarchy within the folder assigned by the WRTVS. For example, a geo-referenced image file contains information about the location and coverage of the imagery data. With geo-referenced data, the WRTVS produces a spatial index of the data files automatically during initialization, as described below. Vector data also contains geo-referencing information.

Elevation data such as DTED (digital terrain elevation data), however, often does not contain geo-referencing information within each file, but rather uses a pre-defined file naming convention and directory hierarchy to define spatial coverage and resolution. For these cases, the WRTVS utilizes the convention defined by the data type.

Figure 3:
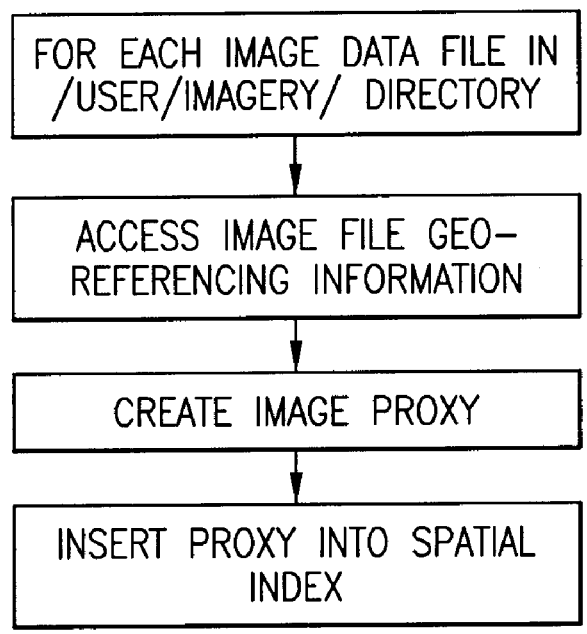
FIG. 3 show a flow chart of the initialization processing.

Referring now to FIG. 3, initialization processing is shown. Upon system initialization, the WRTVS traverses the directory hierarchy for available geo-referenced source data in each of the pre-defined directories as described above in FIG. 2. Each geo-referenced file is queried for its extent and resolution. For each file, a proxy object is created to manage access to the file, correlating each file on disk to its coverage area. For each type of data source, the associated proxies are inserted into a spatial index. A spatial index is a data structure that orders data based on its spatial information to allow quick access to the data based on its location. Examples of such structures are quad-trees, R-trees and kd-trees. The WRTVS utilizes a generic spatial data structure that allows any type of data to be indexed using the desired indexing strategy with the requirement that the data has spatial information. In the WRTVS, each spatial index can be queried for the proxies covering a requested geographic area. The resulting proxies can then be accessed for the data within the query boundary.

Figure 4:
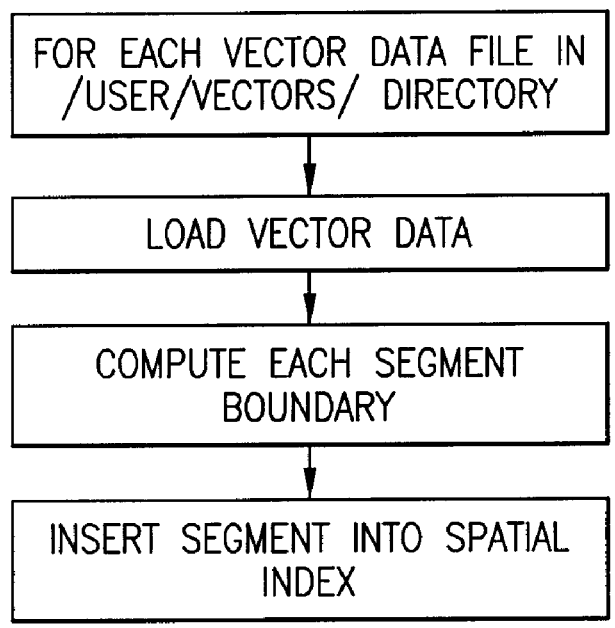
FIG. 4 shows a flow chart for the vector processing in accordance with the invention.

FIG. 4 shows vector processing. Vector data representing roads and water boundaries is loaded at initialization. For each vector segment, its boundary is computed and it is placed into a spatial index.

Because the WRTVS spatially indexes geo-referenced data automatically at load time, the user is free to structure each type of geo-referenced source data in a logical hierarchy rather than a spatial hierarchy. This greatly simplifies data management because data can be structured in a human-understandable manner, thereby lessening the labor required by the user. Because querying a file's geo-referencing requires minimal disk access, the construction of each spatial index is performed rapidly, allowing for data with world-wide coverage to be indexed at load time. While the spatial indexing of user data does happen upon system initialization, if new data becomes available during run time, the WRTVS can be prompted to re-index newly available data and regenerate the terrain in effected areas.

Figure 5:
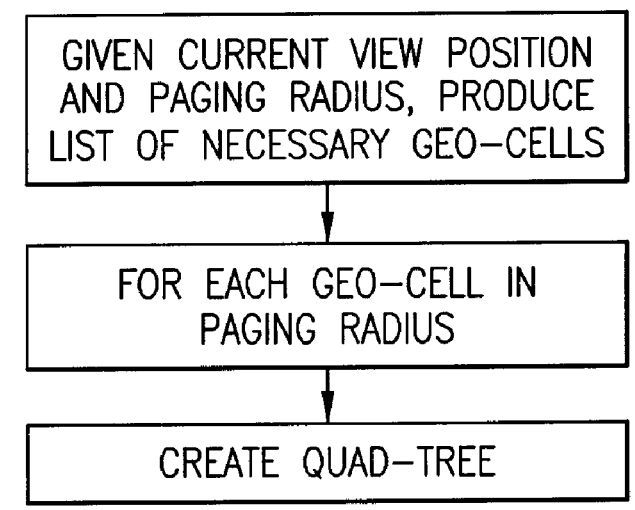
FIG. 5 shows geo-cell creation in a flow chart.

Referring now to FIG. 5, at run-time, the parent application provides information regarding the desired view position and orientation to the WRTVS. Given the world position and a visibility range, the WRTVS calculates the geo-cells required for visualization. A geo-cell is defined as a 1 degree by 1 degree region. At the equator, a geo-cell is approximately 60 nautical miles by 60 nautical miles. For each geo-cell, the WRTVS utilizes the view position to generate a quad-tree terrain hierarchy. Each node in the quad-tree performs queries into the various spatial indexes to determine what user-provided data exists within the node boundary. These queries are processed asynchronously in parallel execution threads to prevent delays caused by expensive disk access operations from affecting the performance of the parent application. While quad-trees are quite common in terrain visualization, the mechanisms used by the WRTVS for the composition of each node happen entirely at run time directly from source data.

Figure 6:
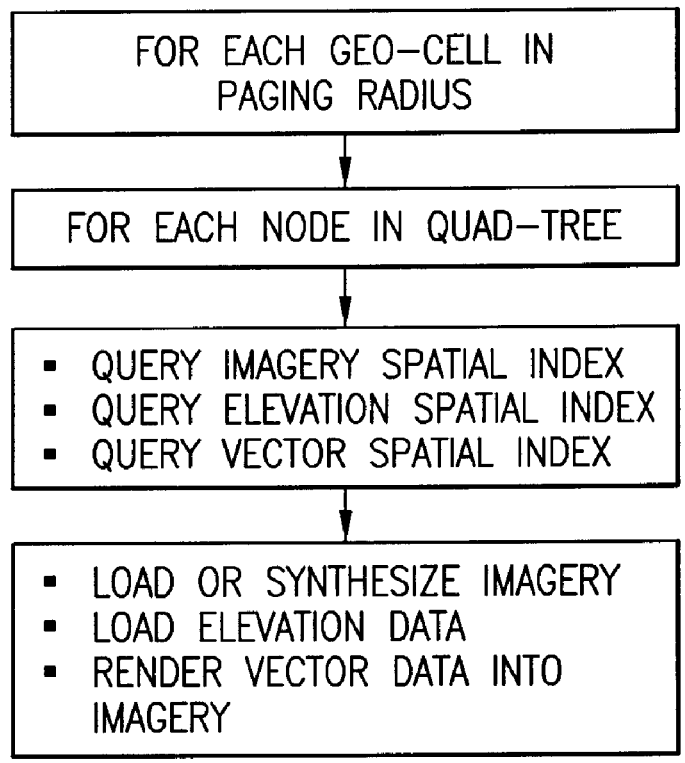
FIG. 6 shows run-time processing in a flow chart.
Figure 7:
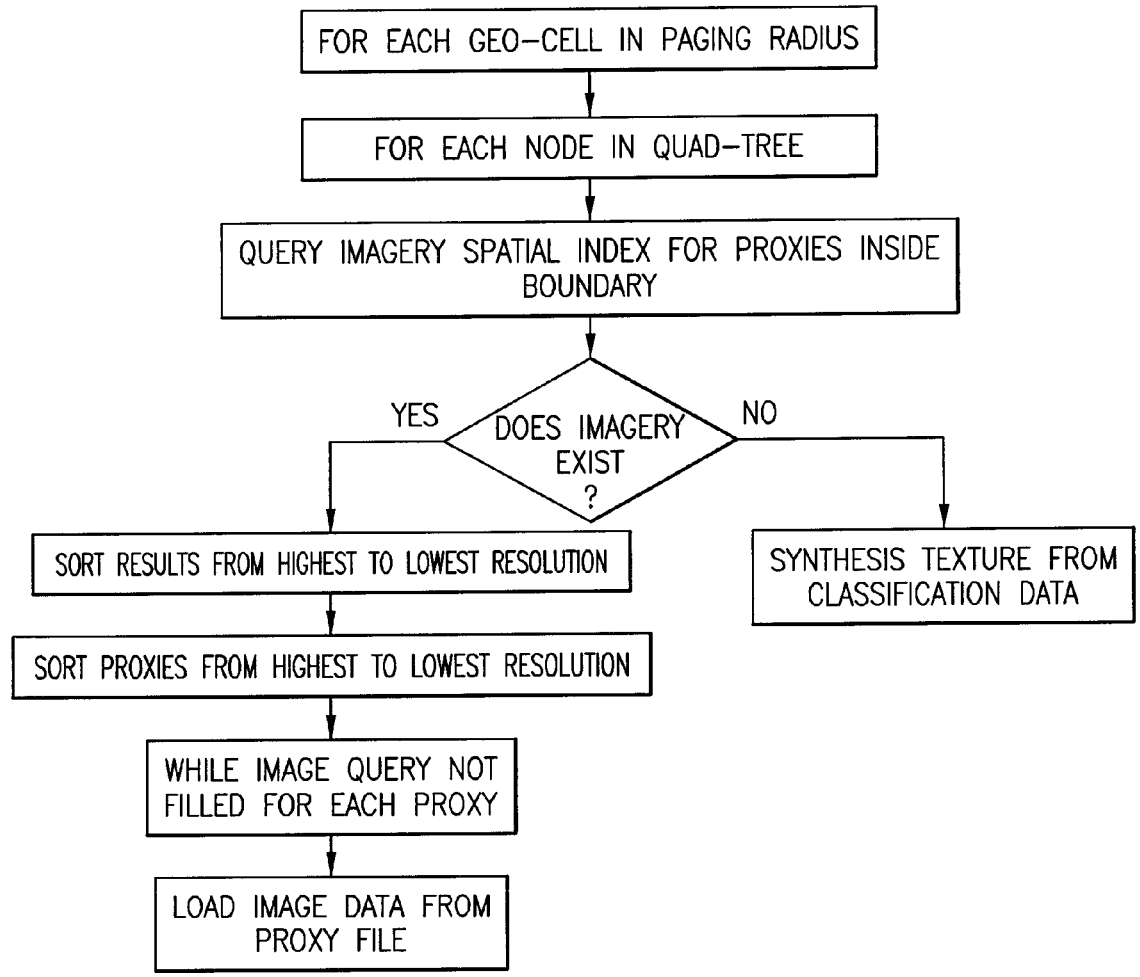
FIG. 7 shows a flow chart for the image processing.

Referring to FIG. 6 and FIG. 7, the run-time processing of imagery queries works as follows. For each node in the terrain quad-tree, a query is constructed defining the extent of the node's geographic coverage. The query contains a temporary 2-D memory buffer of user-defined dimension, utilized for storing the resulting combined image. The imagery spatial index utilizes this query to traverse the proxy hierarchy constructed at initialization. Proxies which have spatial extents that fall inside of or intersect the query boundary are added to a list of candidate proxies to be processed. The proxy list is then sorted from highest resolution to lowest. Each proxy is then queried for the data within the region of interest. This causes the imagery data file represented by the proxy to be accessed and the data within the region to be loaded into the query's temporary image buffer, combining it with previously processed proxy results. After each proxy has been processed, a check is made to determine if the query region has been filled. Once the query region has been filled, proxy processing ceases so that low-resolution data is not loaded if it is completely covered by high-resolution data within the query region. The result is that the highest-resolution data has priority. The resulting combined image buffer is then loaded into graphics memory as a texture for rendering.

In regions that are not intersected by user-provided imagery, texture synthesis is utilized to provide an approximated rendering of the terrain based on land classification data, hydrographic vectors, road vectors, and other sources, allowing for seamless global coverage.

The run-time processing of elevation queries works as follows. For geo-cells which are within the paging radius, the file system is searched in an asynchronous processing thread for available DTED (Digital Terrain Elevation Data) files. If multiple DTED files are found for a given geo-cell, the one with the highest resolution is selected. If no DTED files are found for a give geo-cell, the default elevation data provided with the WRTVS is loaded. Once the elevation data is loaded, normal vectors are computed for terrain lighting. The elevation data is then spatially indexed so that elevation queries are performed rapidly.

Once the elevation data for a geo-cell has been indexed, the terrain quad-tree is constructed. For each node in the tree, the index is queried for elevations falling on a 2-D grid with user-defined dimensions. The elevation is computed by performing a bilinear interpolation of surrounding elevation values. The elevation values are then loaded into graphics memory for rendering.

The vector spatial index is queried at run time for the vectors that fall within each terrain quad-tree node. These resulting vectors are rasterized into the texture image associated with the quad-tree node. Because the vectors are rasterized into the texture image, subsequent rendering of the data only requires rendering of the texture image rather than the individual vectors. This significantly reduces the cost of rendering complex scenes.

Figure 8:
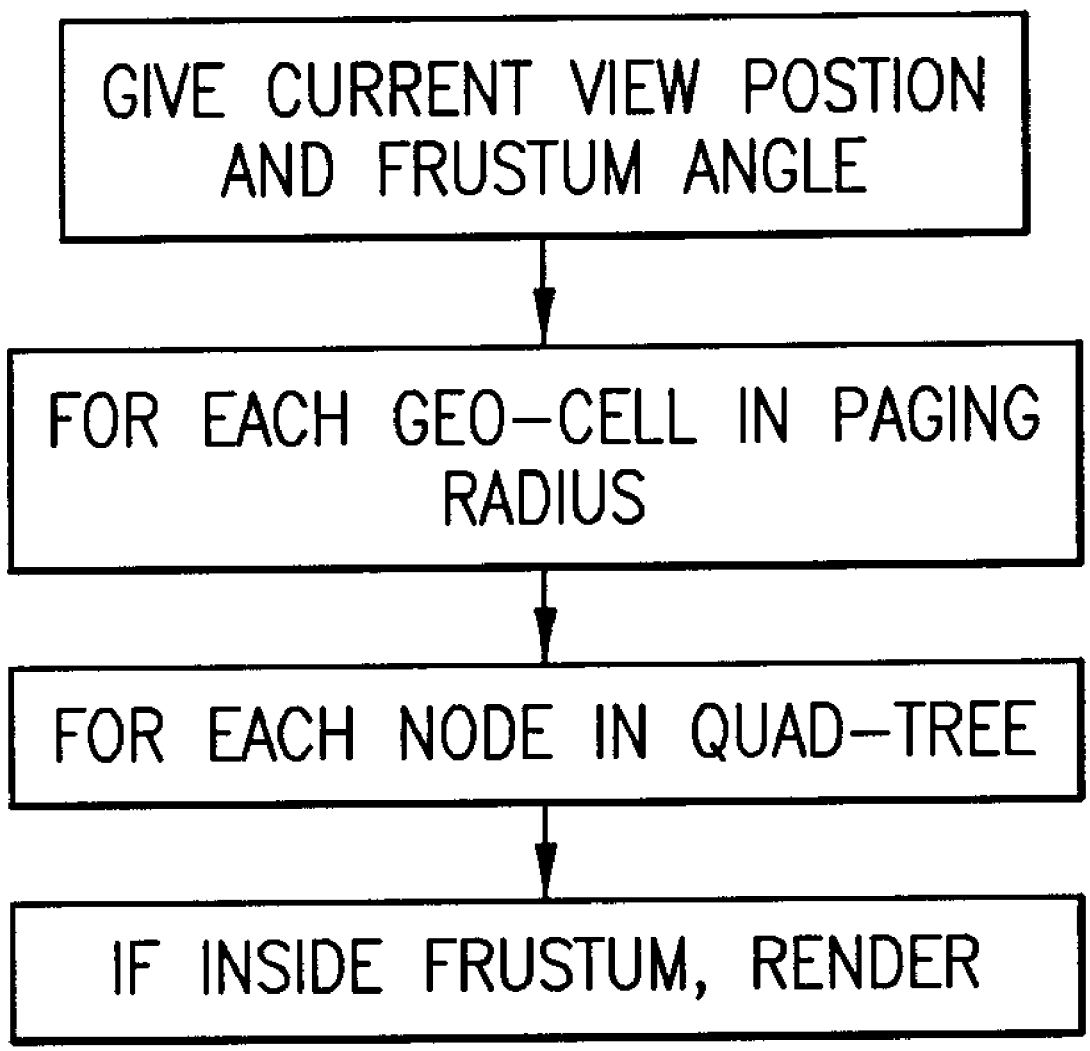
FIG. 8 shows a flow chart for image rendering.

Referring now to FIG. 8, rendering is shown. After the imagery, elevation and vector data for a quad-tree node have been processed and loaded into graphics memory, the nodes that are intersected by or fall within the viewing frustum are displayed. This is accomplished by rendering a mesh of triangles with vertices co-incident with the elevation samples returned by the elevation query. The triangle mesh is mapped with the texture resulting from the imagery query and/or texture synthesis.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A method of database generation for generating terrain images in a simulator display in real-time comprising the steps of:
 (a) providing an input from a parent application that sends latitude, longitude and observer location information for the image to be generated;
 (b) providing a simulator display having an advanced graphic card connected to the display for producing real-time terrain images on the display;
 (c) providing a software library that is connected to the output of the parent application to provide current latitude, longitude and observer view orientation to the software library using function calls;
 (d) connecting the output of the software library to graphics API to communicate with the graphics card to display terrain images in a region of interest;
 (e) using and including a worldwide data set derived from freely available sources for terrain visualization in said software library, said data including imagery, elevation, and vector data;
 (f) organizing user data in said library into a data hierarchy that includes user data derived from imagery data, elevation data and vector data;
 (g) providing initial data processing for each image data file in the user directory including access image file geo-referencing information, creating an image proxy and inserting the image proxy into a spatial index;
 (h) providing for each vector data file in a user's vector directory, loading the vector data, computing each segment boundary, and inserting the segment into a spatial index to provide to vector processing;
 (i) producing a listing of necessary geo-cells given current view position and paging radius, and for each geo-cell in paging radius creating a quad-tree;
 (j) for each geo-cell in the paging radius and for each node in a quad-tree, query image spatial index, query elevation spatial index and query vector spatial index;
 (k) contain run-time processing by loading or synthesizing imagery, load elevational data and render vector data into imagery;
 (l) for each geo-cell in paging radius and for each node in quad-tree, query image spatial index for proxies inside boundary and determine does imagery exist;
 (m) if imagery exists, sort results from highest to lowest resolution, sort proxies from highest to lowest resolution and while image query not filed for each proxy, load image data from proxy file;
 (n) after query of imagery spatial index for proxies inside boundary, if image does not exist, synthesis texture from classification data;
 (o) render the image data by giving view position and frustum angle for each geo-cell in paging radius, for each node in quad-tree; and
 (p) if the image is inside the frustum, render the image to the output to the graphic accelerator card.

2. A method as in claim 1, including wherein said graphics API includes OpenGL and DirectX as the graphics API.

3. A method as in claim 1, wherein:
 the data directory hierarchy includes two different general categories of data which contains embedded geo-referencing information and data which depends on the file hierarchy for geo-referencing.

4. A method as in claim 1, wherein:
 said spatial index is a data structure in quad-trees, R-trees and kd-trees that orders data based on spatial information to allow quick access to the database.

* * * * *